United States Patent [19]

Tonogai

[11] Patent Number: 4,869,600
[45] Date of Patent: Sep. 26, 1989

[54] LINEAR MOTION BALL BEARING

[75] Inventor: Mitsuyasu Tonogai, Nara, Japan

[73] Assignee: Tsubakimoto Precision Products Co., Ltd., Osaka, Japan

[21] Appl. No.: 277,686

[22] Filed: Nov. 29, 1988

[30] Foreign Application Priority Data

Nov. 30, 1987 [JP] Japan .............................. 62-300095
Jul. 1, 1988 [JP] Japan .............................. 63-162600

[51] Int. Cl.⁴ .................................. F16C 29/06
[52] U.S. Cl. .............................. 384/43; 384/45
[58] Field of Search .................. 384/43–45, 384/451; 464/168

[56] References Cited

U.S. PATENT DOCUMENTS 4,478,462 10/1984 Teramachi ........................ 384/45
4,632,573 12/1986 Itoh .............................. 384/45 X
4,662,763 5/1987 Itoh .................................. 384/45
4,743,124 5/1988 Blaurock ............................ 384/45

FOREIGN PATENT DOCUMENTS 0038216 2/1986 Japan ................................ 384/45

Primary Examiner—Thomas R. Hannon
Attorney, Agent, or Firm—Howson & Howson

[57] ABSTRACT

A ball bearing assembly for guiding two machine parts in linear relative motion. Upper, intermediate and lower members are assembled to an inverted U-shaped bearing body which straddles the sides of a rail base. Grooves formed between the members and the bearing body provide circulation paths on either side of the rail base for ball bearings. All components are accommodated within the width of the bearing body.

5 Claims, 10 Drawing Sheets

FIG. 7(a)
FIG. 7(b)
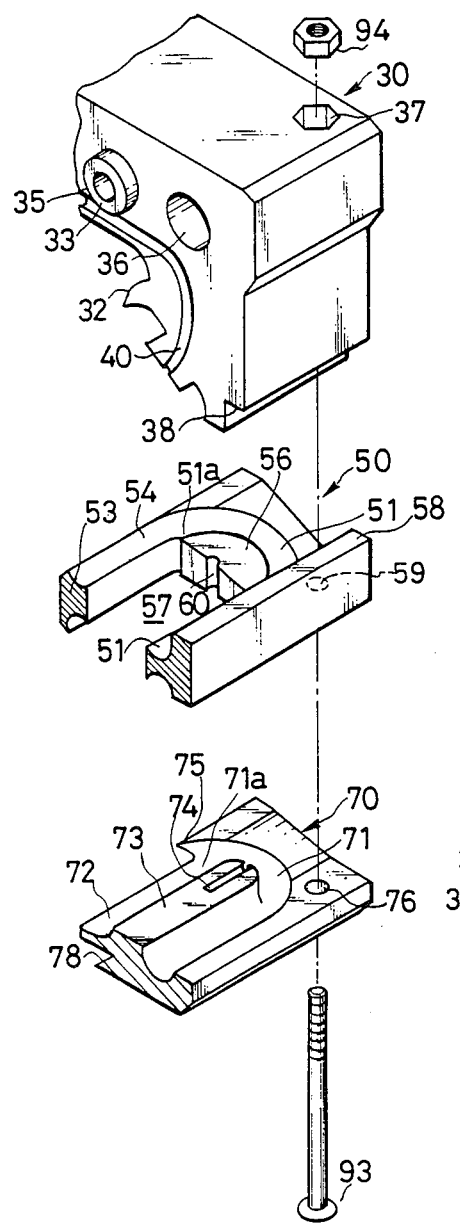
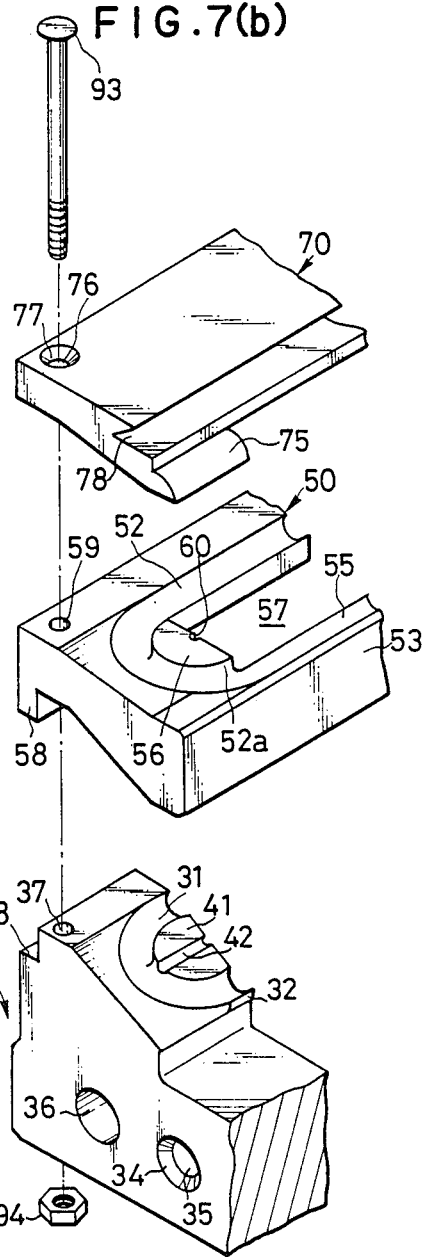

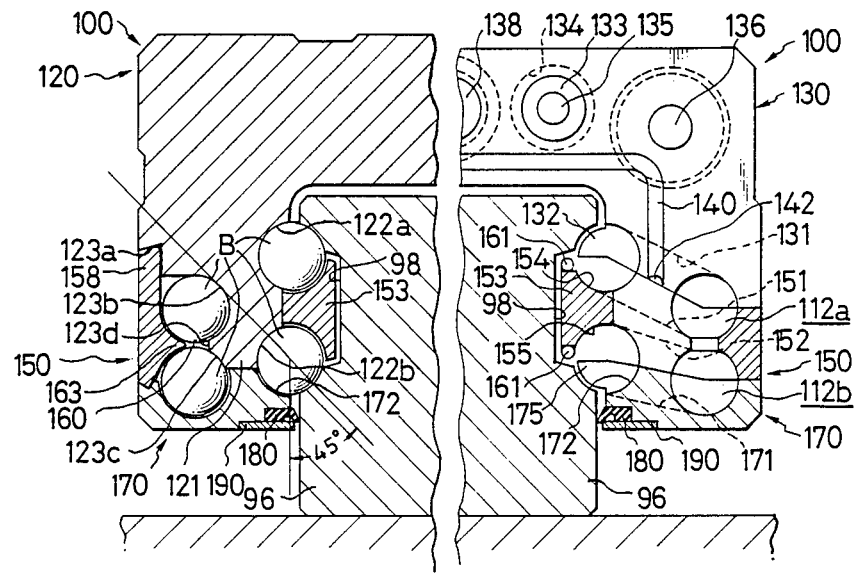

LINEAR MOTION BALL BEARING

BACKGROUND OF THE INVENTION

1. Field of the Invention

This invention relates to a linear motion ball bearing used for guiding portions which perform a linear motion such as a machine tool table, a positioning table, etc.

2 Description of the Prior Art

According to a conventional linear motion ball bearing of this type, generally a ball return hole is formed axially in a bearing body to let balls circulate in an axial direction, and a machining for curved surface is performed to connect end portions of the return hole and a loaded ball groove formed in the bearing body, and further a return cap having a ball turning groove for changing the direction of the balls by 180° is applied to each end portion.

However, in order to prevent balls from falling off when the bearing body is pulled out from a rail base, it is necessary to provide a separate ball retainer. In addition, the aforementioned return caps are required which increases the number of parts.

A very different linear motion ball bearing has been proposed in U.S. Pat. No. 4,632,573, issued Dec. 30, 1986 to Katsutoshi Itoh, in which upper and lower ball circulation paths are formed surrounding a leg portion of a bearing body with loaded ball grooves. By fitting the circulation paths, one upon another, to the leg portion, upper and lower members are each formed with an opposingly J-shaped groove, and an intermediate member is formed on upper and lower sides thereof with opposingly J-shaped grooves and further grooves connecting the tips of said J-shapes.

The above-mentioned bearing does not require curved surface machining at the ends of the loaded ball grooves of the bearing body; nor separate provision of ball retainers. However, it unavoidably becomes larger widthwise, requiring larger space.

Therefore, an overall size becomes larger if one wants to increase the width of the leg with a view to increasing the rigidity of the bearing.

SUMMARY OF THE INVENTION

The present invention has solved the abovementioned problem in which a linear motion ball bearing is provided with a bearing body having a leg portion with upper and lower loaded ball grooves. The upper groove includes a substantially semi-circular section, a lower groove includes a substantially quarter-circular section. A recessed corner portion is formed on an opposite side of the grooves. Upper members, each having a ball turning groove, are connected to the upper loaded ball groove and the corner portion and arranged at both ends of the bearing body. An intermediate member is formed on upper and lower sides thereof with opposingly J-shaped grooves and ball retaining grooves connected to the tips of the J-shapes, and is mounted to the leg portion such that the corner portion serves as an unloaded ball groove and forms an upper ball circulation path with the upper groove of the intermediate member. A lower member, having an opposingly J-shaped groove and ball retaining groove, is connected to the tips of the J-shapes and is arranged to form a lower ball circulation path with the lower groove of said intermediate member.

When the upper, intermediate and lower members are assembled to the bearing body, the two unloaded ball grooves are accommodated into the recessed corner portion of the bearing body, whereby all the members may be accommodated within the width of the bearing body. In addition, like the above-mentioned prior application, there is no need to provide ball return holes to the bearing body and to provide ball turning caps at both ends to change the direction of the balls. Furthermore, a ball retainer may be built-in such that balls do not fall off even when the bearing assembly is separated from the rail base.

BRIEF DESCRIPTION OF THE DRAWINGS

For a better understanding of these and other aspects of the invention, reference may be made to the following detailed description taken in conjunction with the accompanying drawings wherein:

FIGS. 7a and 7b show enlarged broken-away perspective views as viewed from up and down respectively of upper, intermediate and lower members of FIG. 5;

FIG. 11 is a front view of the rail base of

FIG. 13 is a transverse section of FIG. 12 including a rail base;

FIG. 14 is another transverse section of FIG. including the rail base;

FIG. 15 is a front view of FIG. 12 excluding the seal member and the seal securing member;

FIG. 16 is a front view of FIG. 12 including the seal member and the seal securing member;

DESCRIPTION OF THE PREFERRED EMBODIMENTS

Figure 1:
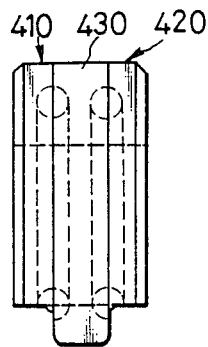
FIG. 1 is a front view of assembled upper, lower and intermediate members of a prior art linear motion ball bearing.
Figure 2:
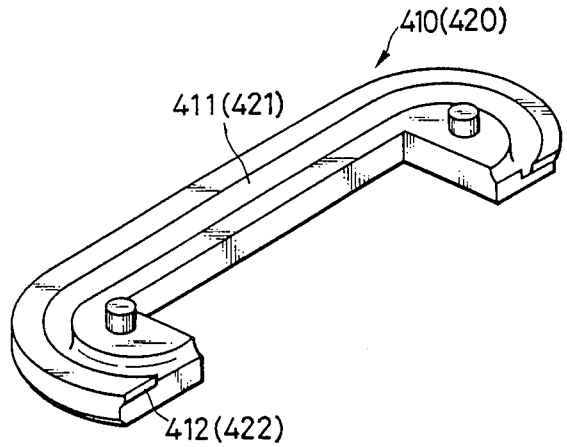
FIG. 2 is a perspective view of the lower member of FIG. 1.
Figure 3:
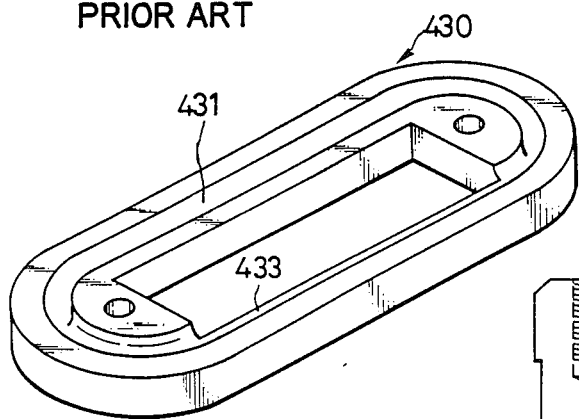
FIG. 3 is a perspective view of the intermediate member of FIG. 1.
Figure 4:
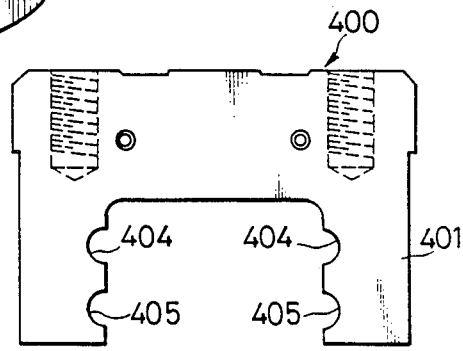
FIG. 4 is a front view of a bearing body for receiving the assembly of FIG. 1.

Referring now to the drawings wherein like characters designate like or corresponding parts throughout the several views, there is shown in FIGS. 1–4 a prior art linear motion ball bearing of said U.S. Pat. No.

4,632,573. The linear motion ball bearing comprises upper and lower members 410, 420 and an intermediate member 430 fitted to a bearing body 400 one upon another to form endless ball circulation paths. The upper and lower members are identically formed. Said members have opposingly J-shaped grooves, the sections of which are nearly semi-circular. The reference numerals 412 and 422 are ball-scooping pawls.

On the other hand, the intermediate member 430 has, on its upper and lower surfaces, opposingly J-shaped grooves complementary to the opposingly J-shaped grooves of the upper and lower members 410 and 420, and ball retaining grooves 433 connecting the tips of said J shapes. The section of the opposingly J-shaped groove 431 is semi-circular so that a circle may be formed with the corresponding grooves of the upper and lower members; and the section of the ball retaining groove 433 is quarter-circular.

The assembly of said upper, lower and intermediate members 410, 420 and 430 are fitted to the leg 401 of the bearing body 400 such that endless ball circulation paths are formed with loaded ball grooves 404 and 405 of semi-circular sections. Said members and the bearing body are secured at both longitudinal ends by means of a cover (not shown).

Figure 5:
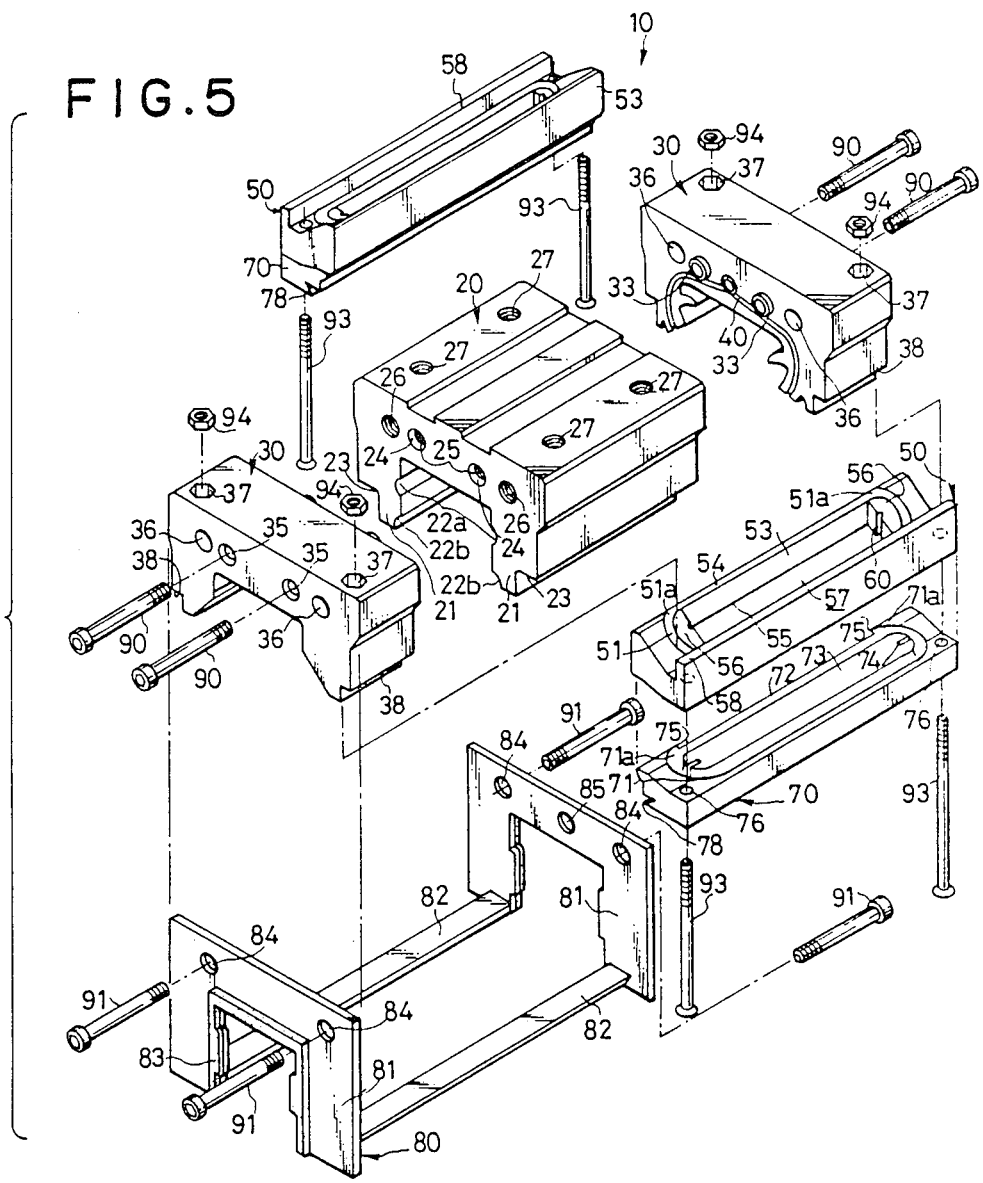
FIG. 5 is a broken-away perspective view of a first embodiment of the invention.
Figure 6:
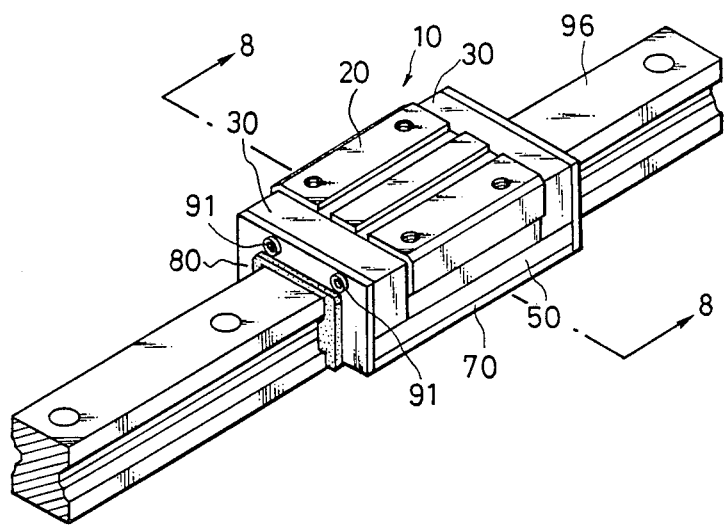
FIG. 6 is a perspective view of the bearing assembly of FIG. 5 mounted to a rail base.

FIG. 5, in contradistinction, shows in disassembled state, a bearing according to a first embodiment of this invention. A bearing body 20, a pair of upper members 30, 30, a pair of intermediate members 50, 50, a pair of lower members 70, 70 and a seal member 80 are secured firmly by means of bolts 90, 91, screws 93 and nuts 94. FIG. 6 depicts the state in which the assembled body is mounted to a rail base 96.

Figure 11:
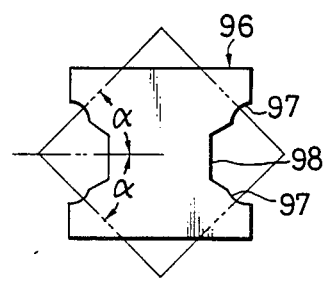

The bearing body 20 has legs 21, 21 riding astride on the rail base 96, the section of which is shown in FIG. 11. At the inner surfaces of the legs, two pairs of upper and lower loaded ball grooves 22a, 22b are opposingly formed. The upper loaded ball grooves 22a are longitudinally extending grooves of semi-circular sections; and the lower loaded ball grooves 22b are of quarter-circular sections, as the lower ends of the legs 21 are cut off. These loaded ball grooves 22a, 22b and the ball rolling surfaces 97, 97 form two pairs of upper and lower loaded areas. These loaded ball grooves 22a, 22b are simple, straight grooves; and curved surfaces need not be machined at both ends thereof like the above-mentioned U.S. Pat. No. 4,632,573.

At the both side surfaces of the bearing body 20, recessed corner portions 23 are formed, such that they are open sidewardly and downwardly. Said corner portions form upper unloaded ball grooves in cooperation with the intermediate members 50 as mentioned below, and accommodate the lower unloaded ball grooves. At the longitudinal ends of the bearing body 20, threaded holes 25 with counterbores 24 for receiving the protrusions 33 of the upper members 30, explained below, and screw holes 26 for securing a seal member 80, are provided; and at the upper surface, screw holes 27 are provided for securing the body, for example, to a table of a machine tool.

To the bearing body 20, the upper member 30, the intermediate member 50 and the lower member 70 are secured. Each member will be explained with reference to FIGS. 7a, 7b, 8 and 9.

A pair of upper members 30, 30 disposed at both ends of the bearing body 20 have at each lower surface a U-shaped ball turning groove 31 connecting the upper loaded ball groove 22a of the bearing body and the corner portion 23. At the end of ball turning groove 31 adjacent to the upper loaded ball groove 22a, a ball scooping pawl 32 is provided. On the surface in contact with the bearing body 20, protrusions 33 for positioning are provided so as to fit into the counterbores 24. On the reverse side, counterbores 34 are provided with a through hole 35 for accommodating fastening bolt 90. A pair of through holes 36, 36 are provided for securing a seal member 80 to the bearing body 20. Vertical through holes 37 are provided to fasten the intermediate member 50 and the lower member 70; and the upper end thereof is adapted to accommodate a nut 94. A stepped portion 38 is provided for accurate positioning in cooperation with a shoulder 58 of the intermediate member 50.

As mentioned above, the upper members 30 are simply positioned adjacent to both ends of the bearing body 20 and do not surround the leg of the bearing body 21, which is different from the invention of said prior U.S. Pat. No. 4,632,573.

At the surface of one of the upper members 30, 30, a grease nipple 39 is provided, which serves to supply lubricating grease to the ball circulation paths. A grease supplying groove 40 is formed such that it may be closed when fastened to the bearing body 20. The grease supplying groove 40 extends to the center of the semi-circular portion 41 surrounded by the ball turning groove 31. Grease may be supplied to the ball circulation path through the longitudinal communicating channel 42. This channel 42 may be provided in the intermediate member as mentioned later.

Figure 8:
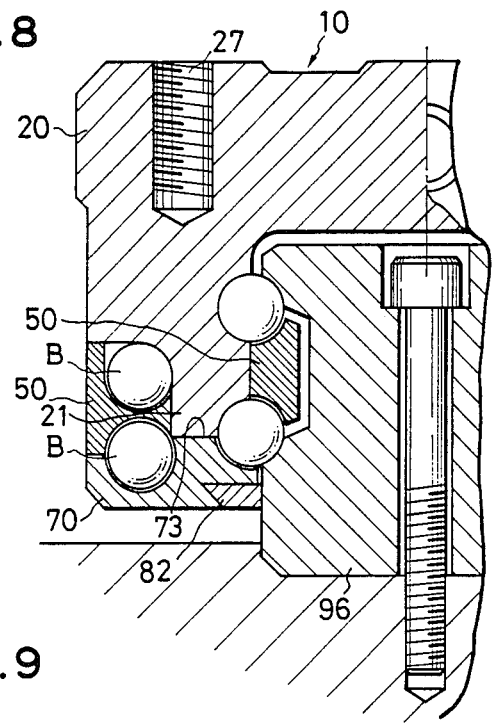
FIG. 8 is a transverse section of the bearing assembly and rail base taken along the line 8—8 of FIG.
Figure 9:
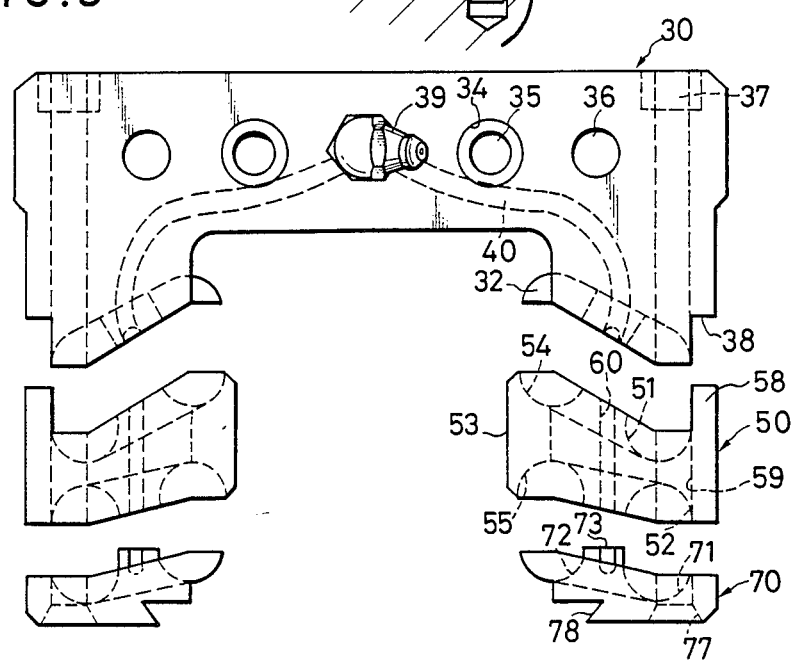
FIG. 9 is a front, broken-away view of the bearing assembly of FIG. 6.

Opposingly J-shaped groove 71 is formed in the lower member 70, the section of which is semi-circular. Between the tips of the J-shapes, a ball retaining groove 72 is formed such that it does not interfere with the balls B which move between the rail base 96 and the bearing body 20. The central portion 73 surrounded by the J-shaped groove 71 and the ball retaining groove 72 abuts, as shown in FIG. 8, against the lower surface of the leg portion 21 of the bearing body 20 and thus the ball retaining groove 72 may be located close to the lower loaded ball groove 22b.

The present invention is distinct over said prior invention in that the lower member 70 abuts against the lower surface of the leg portion 21 and does not accommodate the leg portion.

A communicating groove 74 is formed in the central portion 73 for supplying lubricating grease to the J-shaped groove 71 by way of the intermediate member 50; and at one end of the J-shaped groove 71, a pawl 75 is provided for smoothly guiding the ball B from the lower loaded ball groove 22b into the ball turning path. Close to the end surface of the lower member 70, a through hole 76 is provided as mentioned before; and on the lower surface thereof, a counter-sink 77 is formed to receive a head of a screw 93. In addition, on this lower surface, a dovetail groove 78 is formed to receive a seal member 80.

On the other hand, on the upper surface of the intermediate member 50, opposingly J-shaped grooves 51 are formed complimentary with the ball turning groove 31 of the upper member 30 and the corner portion 23 of the bearing body 20; and on the lower surface as well, opposingly J-shaped grooves 52 are similarly formed. A ball retaining portion 53 is formed with upper and lower ball retaining grooves 54, 55 so as connect the tips of the J-shapes (reference numeral 51a notes one of the tips of the J-shapes on the upper surface). The sections of the upper and lower J-shaped grooves are semi-circular so as to form a circle with corresponding grooves 31, 71 of the upper member 30 and lower member 70, respectively; and the sections of the ball retaining grooves 54, 55 are almost quarter-circular. As shown in FIG. 11, the ball retaining portion 53 extends along the groove 98 of the rail base 96.

At the turning portions of the J-shaped grooves 51, 52, a half cylinder-like portion 56 is formed; and the hollow portion 57 surrounded by the portion 56, J-shaped grooves 51, 52 and the ball retaining portion 53 is adapted to accommodate the leg portion 21 of the bearing body, and the shoulder 58 abuts against the lower surface of the corner portion 23 so as to form a ball circulation path with the elongated part of the J-shaped groove 51. Adjacent to one end of the intermediate member 50, a through hole 59 is formed so as to align with the holes 37, 76 of the upper member 30 and lower member 70, respectively. The stepped portion 38 receives the shoulder 58 to ensure accurate positioning of each member in cooperation with the fastening by means of screws through holes 37, 59 and 76. And, when the intermediate member 50 is fit to the bearing body 20, a channel 60 is formed at the inner side of the half cylinder portion 56 so as to connect the grease supplying grooves in the upper member 30 and the lower member 70.

The seal member 80 (FIG. 5) comprises a pair of opposing front plates 81, 81 and a pair of base plates 82, 82 adapted to fit into the dovetail groove 78 of the lower member 70. On the outer surface of the front plate 81, through holes 84, 84 for securing to the bearing body 20 and a hole 85 for communicating with a grease nipple 39 are respectively provided. A rubber material 83 is secured to the plate 84 so as to come into a sliding contact with the groove 97 of the rail base 96. A rubber material seal is also provided to the opposing inner surfaces of the base plates 82, 82.

In order to incorporate balls B (FIG. 8) into the bearing assembly, the bearing body 20 is first put on an assembling jig (not shown) upside down; and then, the upper members 30, 30 each having a ball turning groove 31 are fastened to the end surfaces of the bearing body 20 by means of the bolts 90 so that said grooves face upward. After forming endless ball circulation paths with the jig, upper members 30, 30 and the bearing body 20, balls B are introduced. Thereafter, the intermediate members 50, 50 are fit to the legs 21, 21 of the bearing body 20, and balls B are inserted into the circulation paths 52 and ball retaining grooves 55. On top of the assembly thus formed, the lower members 70, 70 are placed, with the base plates 82, 82 having been fit into the dovetail grooves 78, 78 of the lower members. Then, the assembly is fastened by means of the screws 93 and nuts 94. Thus, endless ball circulation paths are formed with the loaded ball grooves 22a, 22b forming a part thereof. Furthermore, the seal member 80 may be secured by means of the bolts 91. Needless to say, the seal member 80 may be used only when it is required.

Figure 10:
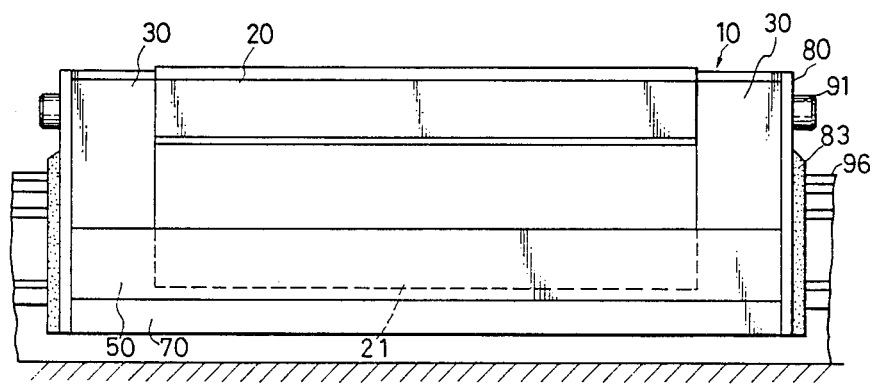
FIG. 10 is a side view of the bearing assembly and rail base of FIG. 6.

In a linear motion bearing 10 thus assembled, as shown in FIG. 6, the side faces of the bearing body 20, the upper member 30, the intermediate member 50 and the lower member 70 are flush with each other, and consequently, all members may be accommodated within the width of the bearing body 20. FIG. 10 is a side view of the assembled bearing showing that no extra space is required in the longitudinal direction as well.

The ball retaining portion 53 having ball retaining grooves connecting the tips of the J-shapes of the grooves 51, 52 of the intermediate member 50 extends along the groove 97 of the rail base 96. In the assembled state, only about a quarter portion of one ball B may be exposed, as shown in FIG. 8; and consequently, balls may be retained in cooperation with the loaded ball grooves 22a, 22b, even when the bearing assembly is separated from the rail base 96.

A second embodiment of the invention will now be explained with reference to a linear motion bearing 100 which incorporates a few improvements over the first embodiment. The improvements may be summarized as follows.

Firstly, as seen from FIG. 8, there is a thin portion between the upper and lower unloaded ball grooves of the intermediate member 50. Since a predetermined minimum amount of thickness is required when forming this member by plastics, the upper unloaded ball groove must be set sufficiently upward in FIG. 8 in order to reduce the embodiment of FIG. 8 to practice. On the other hand, if the upper unloaded ball groove is set upward, a cavity may be formed in the direction of load applied to the lower loaded balls (ordinarily 45 degrees from normal line), which causes the rigidity of the leg portion 21 to decrease (see FIG. 13). This is the first point of improvements. Simplification of a grease introducing path to the lower ball circulation path will be effected at the same time.

Secondly, ball turning paths are formed between the upper member and the intermediate member, and between the intermediate member and the lower member. Said ball turning paths, especially those portions for receiving loaded balls, are subjected to reaction forces and centrifugal forces during the turning of the balls. Thus, if the portions in question comprise only plastic material, wear will be remarkable. This is the second point of improvements.

Figure 12:
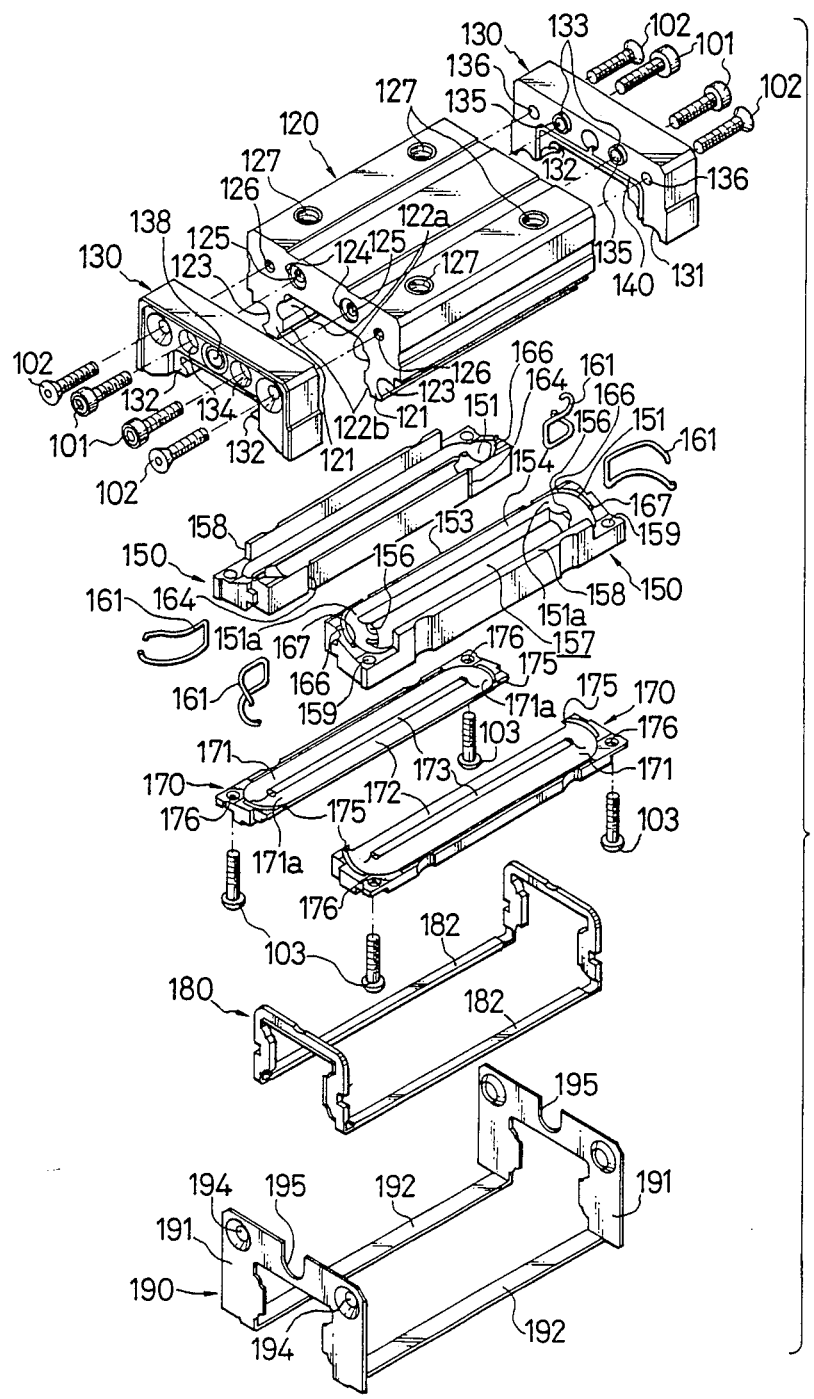
FIG. 12 is a broken-away perspective view of a second embodiment of the invention.

Referring to FIG. 12, there is illustrated a linear motion ball bearing 100 (excluding balls and a rail base) according to the second embodiment of this invention. The bearing body 120, a pair of upper members 150, 150, a pair of lower members 170, 170, a seal member 180 and a seal securing member 190 are fastened by means of bolts 101, 102, screws 103 and nuts (not shown) received in the upper member.

As shown in FIG. 12, the bearing body 120 has a pair of legs 121, 121 so as to ride astride on the rail base 96 as was the case with the first embodiment. And two pairs of opposing loaded ball grooves 122a, 122b are formed in the inner surfaces of the leg portions 121, 121. The upper loaded ball groove 122a extends longitudinally and has a semi-circular section; and the lower loaded ball groove 122b has a quarter-circular section as the lower end of the leg portion 121 is cut off. These loaded ball grooves 122a, 122b form two pairs of upper and lower loaded ball areas in cooperation with the grooves formed in the rail base 96. These loaded ball grooves 122a and 122b are straight grooves with no curved surface machinings at both ends thereof as is the case with the above-mentioned U.S. Pat. No. 4,632,573 and the first embodiment of this invention.

At both side surfaces of the bearing body 120, longitudinally extending recessed corner portions 123, 123 are respectively formed so as to open sidewardly and downwardly. The upper and lower unloaded ball grooves 112a, 112b are formed at this portion in cooperation with the intermediate member 150 and lower member 170 as will be explained later (see FIGS. 13 and 14).

As illustrated in FIGS. 13 and 14, the corner portion 123 has three grooves and one protrusion. The first groove 123a has an acutely angled corner and is for receiving the intermediate member 150; the second groove 123b is of substantially semi-circular section for forming an upper unloaded ball groove 112a; and the third groove 123c is of substantially quarter-circular section for forming a lower unloaded ball groove 112b. The groove 123c may be done away with by displacing the lower unloaded ball groove slightly downwardly in FIG. 13 (see FIG. 8). A protrusion 123d is formed between the second and third grooves.

The longitudinal end surfaces of the bearing body are provided with threaded holes 125 with an annular enlargement 124 for receiving a protrusion 133 of the upper member 130, and threaded holes 126 for securing a seal member 190. On the upper surface of the bearing body, threaded holes 127 are formed for connection, for example, with a table of a machine tool.

The upper members 130, 130, the intermediate members 150, 150 and the lower members 170, 170 are fastened to the bearing body 120. Each member will be explained with reference to FIGS. 12 and 13-16.

At the lower surface of the upper member 130, a U-shaped ball turning groove 131 is formed so as to connect the upper loaded ball groove 122a of the bearing body 120 and the second groove 123b of the corner portion 123 (FIG. 14), and a ball scooping pawl 132 is formed at the end of the ball turning groove 131 adjacent to the upper loaded ball groove 122a. At the abutment surface with the bearing body 120, protrusions 133 are formed so as to engage with the aforementioned annular enlargements 124; and at the reverse side, a pair of through holes 135 having counterbores for receiving the head of bolts 101, and a pair of through holes 136 for securing a seal member 190 are respectively formed. At the lower surface, tapped holes are provided to fasten the intermediate and lower members.

In addition, a grease nipple 105 may be provided to the hole 138 of the upper member 130, which enables the supply of grease to the ball circulation paths. Grease supply groove 140 is formed so as to be closed when the upper member 130 is secured to the bearing body 120, which groove extends to the center of the semi-circular portion surrounded by the ball turning groove 131; and grease may be supplied therefrom to the ball circulation paths through a longitudinally extending groove 142 (see FIG. 14).

Opposingly J-shaped grooves 171 are formed in the lower member, the section of which is almost semicircular. Between the tips of said J-shapes, ball retaining groove 172 is formed so as not to interfere with the balls B held between the rail base 96 and the bearing body 120. The central portion 173 surrounded by the J-shaped grooves 171 and the ball retaining groove 172 abuts, as shown in FIG. 13, the lower surface of the bearing body 120; and thus, the ball retaining groove 172 comes adjacent to the lower loaded ball groove 122b.

At both ends of the J-shaped grooves 171, ball scooping pawls 175, 175 are provided for smoothly introducing the balls from the lower loaded ball grooves into the ball turning paths. Through holes 176 are provided for fastening by means of screws 103, the heads of which are received in the recesses 177. Moreover, on the lower surface, stepped portions 178, 179 are provided for receiving a seal member 180 and seal fixing member 190, respectively (FIG. 15).

On the other hand, as shown in FIGS. 12 and 14, the upper surface of the intermediate members 150 is formed with opposingly J-shaped groove 151 so as to be complementary with the ball turning groove 131 of the upper member 130 and the corner portion 123 of the bearing body 120; and a similarly opposingly J-shaped groove 152 is formed. Furthermore, the ball retaining portion 153 is formed with upper and lower ball retaining grooves 154, 155 connecting the tips of said J-shapes (see reference numeral 151a). Each of said ball retaining grooves 154, 155 has a substantially quartercircular section. The ball retaining portion 153 extends along the groove 98 of the rail base 96 as shown in FIG. 11.

Denoted by 163 in FIG. 13 is a protrusion which opposes the protrusion 123d of the leg portion 121 with a space therebetween. The upper unloaded ball groove 112a having a substantially circular section is formed by the second groove 123b of the corner portion 123 and the J-shaped groove 151 of the intermediate member 150. Moreover, the lower unloaded ball groove 112b of a similarly substantially circular section is formed by the third groove 123c of the corner portion 123, the lower J-shaped groove 152 of the intermediate member 150 and the J-shaped groove 171 of the lower member 170.

The gap between the protrusions 123 and 163 is a slit which connects the upper unloaded ball groove 112a and the lower unloaded ball groove 112b in the longitudinal direction of the J-shaped grooves 151, 152. A similar slit may be provided between the upper and lower J-shaped grooves 51, 52 at the thin central portion in the first embodiment. The slit may be provided only partly in the longitudinal direction.

The slit enables uniform lubrication of both the upper and lower ball circulation paths. In the first embodiment, grease supply paths are provided to all of the upper, lower and intermediate members; however, such a path is provided only to the upper member 130. This of course serves to simplify the whole structure of the bearing.

The grease supplied at the nipple 105 may be supplied to the upper unloaded ball groove 112a by way of the hole 138, the supply groove 140 and the communicating groove 142. Since the lower unloaded ball groove 112b can communicate with the upper unloaded ball groove 112a through the slit 160, the grease may be distributed to each groove with the balls as media. This means that not only the slit but the upper unloaded ball groove 112a is utilized as the grease supply path.

By comparing FIG. 13 with FIG. 8, it will be appreciated that in the FIG. 13 embodiment, the separation of the upper and lower unloaded ball grooves by means of the intermediate member only is replaced by the separation by means of the two opposing protrusions with a gap therebetween. Thus, the thin portion of the intermediate member as seen in FIG. 8 may be done away with; and furthermore, since the position of the upper unloaded ball groove 112a may be made lower, it is possible to eliminate cavities between the line normal with respect to the center of the lower loaded balls and the line inclined 45° outwardly therefrom. This serves to increase rigidity of the leg portions and simplify the grease supply path by virtue of the slit 160 as mentioned above Another improvement reinforces the ball turning paths. As mentioned before, ball turning paths are formed in the portions held by the upper member and the intermediate member, and between the intermediate member and the lower member to turn the moving directions of the balls by 180°. These ball turning paths (especially the portions where the loaded balls are introduced) are subjected to the reaction force during the turning of the balls and the balls are pushed toward the bottom of the groove because of the centrifugal force; and consequently, if these paths are formed by plastics only, significant wear is unavoidable. Therefore, it is preferable to reinforce at least the quarter portion where the loaded balls are received. The improvement is explained in detail as follows.

As shown in FIG. 12, at the ball retaining portion 153 of the intermediate member 153, notches 164, 164 are formed. In addition, beyond the notch 164, a retaining groove 166 is formed so as to cover almost half of the ball turning path. The section of said retaining groove is almost semi-circular. The retaining groove comes to an end at the insertion hole 167 which is provided at the end of the upper and lower J-shaped grooves. This arrangement is provided at both sides of the intermediate member 150. Denoted by the numeral 161 is the reinforcing member in the form of a clip, the ends of which are inserted into the holes 167, 167 and placed along the retaining grooves 166, 166 with the middle portion held in the notch 164. The reinforcing member 161 comprises an elastic metal wire and is placed into position as mentioned above.

The notch 164 is larger than the wire diameter so that the reinforcing member 161 will not interfere with the rail base 96. On the other hand, the retaining groove 166 has a depth to receive one half of the wire diameter. Therefore, the respective complimentary grooves are provided in the upper member 130 and the lower member 170 in the opposing surfaces thereof.

As the balls B move from the loaded ball groove to the unloaded ball groove, the pawls 132, 175 scoop the balls in cooperation with the ball retaining portion 153. The balls turn in direction while being pushed against the reinforcing member 161. Thus, the reinforcing members serve to increase the service life of the bearing.

A half cylindrical portion 156 is formed at the ball turning portion of the J-shaped grooves 151, 152. The hollow portion surrounded by the half cylindrical portion 156, opposingly J-shaped grooves 151, 152, and the ball retaining portion 153 fits into the leg portion 121 of the bearing body 120, and the shoulder 158 abuts the groove 123a of the corner portion 123. The shoulder 158 has an acute angle and serves to accurately position the intermediate member 150 relative to the bearing body 120.

Adjacent one end of the intermediate member 150, a through hole 159 is formed so as to align with the through hole 176 of the intermediate member 170 and the tapped hole in the upper member 130.

As shown in FIG. 15, the assembled upper, lower and intermediate members have, at both longitudinal ends, a first stepped portion 110 for receiving a seal securing member 190, and a further recessed stepped portion 111 for receiving the seal member 180. The seal member 180 is inserted into the second stepped portion 111 for sealing the gap in the longitudinal direction; and the connecting portions 182 are fitted into the stepped portion 178 of the lower member 170 to seal in the vertical direction. Thus, foreign matter may be prevented from entering the bearing assembly from both the longitudinal and vertical directions Outwardly of the second stepped portion 111, the seal securing member 190 is fastened into the first stepped portion 110.

The seal securing member 190 comprises a pair of opposing front members 191, 191, and a pair of connecting members 192, 192 fitting into the stepped portion 179 of the lower member 170. The front members have through holes 194, 194 with countersinks for connection to the bearing body 120, and a notch for mounting a grease nipple 105 to the upper members 130.

In order to incorporate balls, the bearing body 120 is first placed on an assembly jig (not shown) upside down. Next, a pair of the upper members 130, 130 are secured to the front ends of the bearing body 120 such that the grooves face upward. After forming an endless ball circulation path with the jig, upper members 130, 130 and the bearing body 120, balls are put into the groove. Thereafter, the intermediate members 150, 150 are fit to the respective leg portions 121, 121 and the balls are put into the J-shaped grooves 152, 152 and the ball retaining groove 155.

Then, the lower members 170, 170, each fitted with the connecting member 182 of the seal member 180 into the stepped portion 178, and the lower member 170 into the stepped portion 179 are placed thereon. The assembly thus formed is fastened by means of the screws 103 threaded into the tapped holes in the upper members 130, 130. Thus, the upper and lower ball circulation paths are formed with the upper and lower loaded ball grooves 122a, 122b forming a part thereof. The seal securing members 190, 190 are finally fastened to the bearing body 120 by means of the bolts 102.

The linear motion ball bearing 100 thus assembled is capable, like the first embodiment, of accommodating all the members within the width of the bearing body 120 and the balls may be retained even when the bearing assembly is separated from the rail base 96.

The improvement resulting from the provision of the slit between the upper and lower unloaded grooves; and the reinforcement of the ball turning paths should not be limited to the illustrated embodiment comprising the upper members 130, intermediate members 150 and the lower members 170.

Accordingly, a third embodiment of this invention will be explained with respect to a conventional block type linear motion ball bearing with reference to FIGS. 17-20. Only the different structures will be explained.

The ball retaining portion 253 of the intermediate member 250 is provided with notches 264, 264. The grooves 265, 265 connect said notches to the ball retaining grooves 254, 254; and the retaining groove 266 is provided so as to extend along the ball turning groove 251. Namely, the retaining groove 266 is formed in the region where the loaded balls are received. The retaining groove 266 ends at the hole 267 provided at one longitudinal end of the J-shaped grooves 251. The lower surface of the intermediate member 250 is similarly formed. Denoted by the reference numeral 261 is a reinforcing member placed into the notch 264, grooves 265, 266 and inserted into the hole 267 at both ends. The reinforcing member 261 is made of a metallic wire and positioned as mentioned above.

Figure 19:
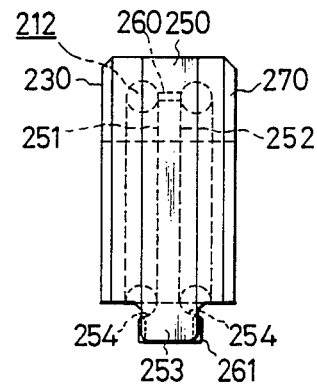
FIG. 19 is a front view of the assembled upper, lower and intermediate members of FIG. 12.
Figure 20:
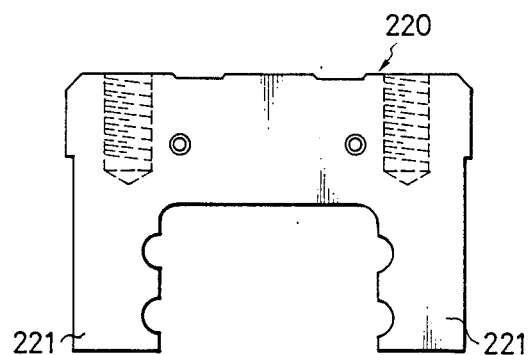
FIG. 20 is a front view of the bearing body of FIG. 12.
Figure 21:
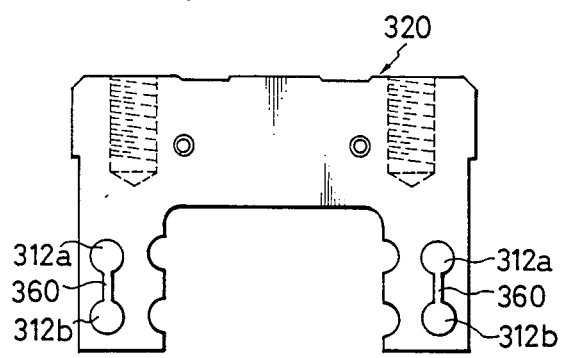
FIG. 21 is a front view of another bearing body.

The width of the notch 264 is greater than the diameter of the reinforcing member 261 and the grooves 265 and 266 are adapted to receive approximately one half of the reinforcing member 261. Moreover, on the opposing surface of the upper member 230 and the lower member 270, the retaining grooves 236, 276 are respectively formed for receiving the reinforcing member 261. The three members placed one upon another as shown in FIG. 19 are fit to the leg portion 221 of the bearing body 220 such that the assembled members surround the leg portion. The reinforcing member 261 functions as mentioned before with reference to the second embodiment.

Figure 17:
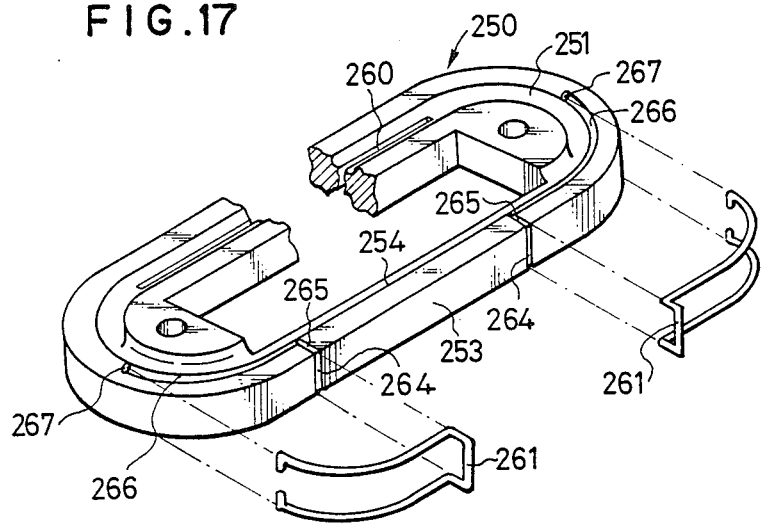
FIG. 17 is a perspective view of the intermediate member of FIG. 12.
Figure 18:
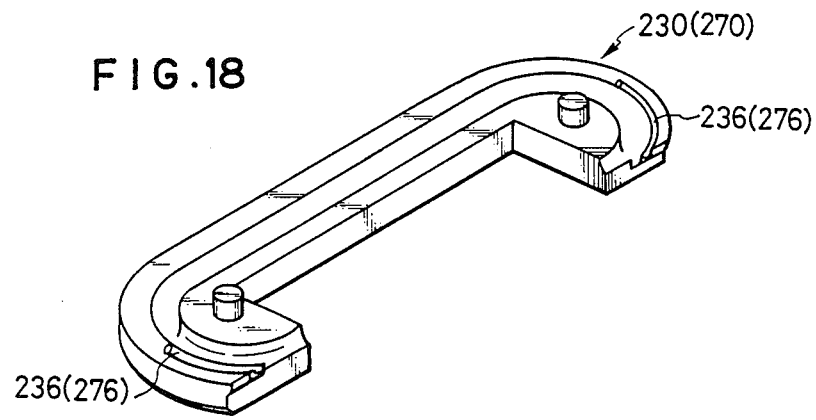
FIG. 18 is a perspective view of the upper (lower) member of FIG. 12.

Another improvement is to communicate the upper and lower J-shaped grooves by means of a slit 260. As illustrated in FIGS. 17, 19, a slit 260 is provided at a thin portion between the upper and lower J-shaped grooves 251, 252 so as to communicate said two grooves.

Thus, as mentioned with reference to the second embodiment, grease may be evenly supplied to both grooves.

A more conventional bearing body 320 having longitudinal ball return bores 312a, 312b may also be provided with a slit 360 so as to achieve the same effect.

Application of the present invention is not limited to such a symmetrical bearing shape as shown in FIG. 6. A linear motion ball bearing may be constituted by forming an only one-side bearing body portion having a ball circulation mechanism and a rail base as separate unit type modules and bolting these modules to other machine parts (e.g. table and bed of a machine tool). It goes without saying that the ball groove may be formed in a circular shape to receive loading equally in four directions. In this case, an angle of contact, between the rail base and ball shown in FIG. 11 is set about 45 relative to the horizontal direction.

The plan shape of the ball turning portion of the J-shapes may be semi-circular, U-shaped, or rectangular with chamfered corners, etc.

ADVANTAGES OF THE INVENTION

Being structured as mentioned above, the linear motion ball bearing of the present invention is capable of accommodating all the members within the width of the bearing body, and consequently, can be made compact. In addition, the bearing body need not be provided with conventional ball return holes and need not be given curved surface machining at the ends of the loaded ball grooves. Moreover, since the section of the lower loaded ball groove of the bearing body can be quarter circular, the machining thereof can be simpler. Such a structure does not require separate members for turning the balls, such as, ball return caps. Furthermore, being equipped with ball retainers, the balls will not fall off even when the bearing assembly is separated from the rail base. Therefore, the number of the parts may be less, which also serves to reduce the manufacturing costs.

As a result, even if the width of the leg portions of the bearing body is made somewhat larger to increase the rigidity, the overall size of the bearing assembly can be relatively small.

The provision of the slits between the upper and lower unloaded ball grooves serves to evenly distribute grease to the entire ball circulation paths, which is useful to simplify the grease supply paths and to facilitate manufacturing.

By providing reinforcing members, wear of the ball turning paths may be reduced, which is useful for increasing the service life.

I claim:
1. A linear motion ball bearing comprising:
   a bearing body having a leg portion with an upper loaded ball groove having a substantially semi-circular section, a lower loaded ball groove having a substantially quarter-circular section and a recessed corner portion on an opposite side of said grooves;
   upper members each having a ball turning groove connecting said upper loaded ball groove and the corner portions, and arranged at both ends of said bearing body;
   an intermediate member having, on upper and lower said thereof, C-shaped grooves formed of opposing J-shaped grooves and ball retaining grooves connecting the ends of said C-shaped grooves, said intermediate member being mounted to said leg portion whereby said corner portion serves as an unloaded ball groove to form an upper ball circulation path with the upper grooves of said intermediate member; and
   a lower member having, on an upper side thereof, a C-shaped groove formed of opposing J-shaped grooves and a ball retaining groove connecting the ends of said C-shaped groove, said lower member being mounted to said intermediate member whereby said lower member grooves form a lower ball circulation path with the lower grooves of said intermediate member.
2. A linear motion ball bearing according to claim 1 further comprising:
   reinforcing members of metallic wire arranged at least at loaded ball receiving portions of said ball circulation paths formed between said upper member and said intermediate member, and between said intermediate member and said lower member.
3. A linear motion ball bearing according to claim 1 wherein:
   said leg portion is solid between a vertical line through the center of a ball retained in the lower loaded ball groove and a line inclined 45 degrees outwardly from said vertical line.
4. A linear motion ball bearing according to claim 3 further comprising:
   a slit communicating said upper said lower unloaded ball groove.
5. A linear motion ball bearing according to claim 4 further comprising:
   reinforcing members of metallic wire arranged at least at loaded ball receiving portions of said ball circulation paths formed between said upper member and said intermediate member, and between said intermediate member and said lower member.

* * * * *

UNITED STATES PATENT AND TRADEMARK OFFICE
CERTIFICATE OF CORRECTION

PATENT NO. : 4,869,600
DATED : September 26, 1989
INVENTOR(S) : Mitsuyasu Tonogai It is certified that error appears in the above-identified patent and that said Letters Patent is hereby corrected as shown below:

Column 4, line 67, "notes" should read --denotes--;

Column 11, line 29, "45" should read --45°--;

Column 12, line 19, "said" should read --sides--;

Column 12, line 50, after the word "upper" insert --unloaded ball groove and--.

Signed and Sealed this

Eleventh Day of September, 1990

Attest:

HARRY F. MANBECK, JR.

*Attesting Officer*   *Commissioner of Patents and Trademarks*